United States Patent [19]
Sato

[11] Patent Number: 6,029,011
[45] Date of Patent: Feb. 22, 2000

[54] CONTROL DEVICE FOR FLASH DEVICE USED FOR CAMERA

[75] Inventor: Yoichi Sato, Yokosuka, Japan

[73] Assignee: Canon Kabushiki Kaisha, Tokyo, Japan

[21] Appl. No.: 09/159,708

[22] Filed: Sep. 24, 1998

[30] Foreign Application Priority Data

Sep. 29, 1997 [JP] Japan ..................................... 9-264202

[51] Int. Cl.⁷ .................................................. G03B 15/05
[52] U.S. Cl. .......................... 396/157; 396/201; 396/159; 396/163
[58] Field of Search .................................. 396/157, 201, 396/159, 163

[56] References Cited

U.S. PATENT DOCUMENTS

| Re. 35,877 | 8/1998 | Takagi ...................................... 396/157 |
| 4,541,703 | 9/1985 | Kataoka et al. ......................... 396/157 |
| 4,710,012 | 12/1987 | Yamada .................................... 396/157 |
| 4,717,934 | 1/1988 | Kobayashi et al. ..................... 396/157 |

*Primary Examiner*—W. B. Perkey
*Attorney, Agent, or Firm*—Robin, Blecker & Daley

[57] ABSTRACT

A control device for a flash device used for a camera, or a camera adapted to use a flash device, includes an object luminance detecting sensor part for making preliminary light emission before exposure and measuring object luminance obtained during the preliminary light emission, an aperture value determining circuit for determining a full-open aperture value of a photo-taking lens used for the camera, a deciding circuit for deciding an amount of light emission to be made by the flash device during exposure by the camera, in accordance with a detection result of the object luminance detecting sensor part and a determination result of the aperture value determining circuit, and a restraining circuit for finding whether the camera is in such a state as to have the full-open aperture value correctly determined by the aperture value determining circuit and, if the camera is found to be not in such a state as to have the full-open aperture value correctly determined by the aperture value determining circuit, restraining light-emission control of the flash device based on a decision of the deciding circuit from being performed.

15 Claims, 7 Drawing Sheets

DURING SELECTION OF LEFT FOCUS
DETECTING POINT

FIG.6(c)

DURING SELECTION OF MIDDLE
FOCUS DETECTING POINT

FIG.6(d)

DURING SELECTION OF RIGHT
FOCUS DETECTING POINT

FIG. 7

CONTROL DEVICE FOR FLASH DEVICE USED FOR CAMERA

BACKGROUND OF THE INVENTION

1. Field of the Invention

The present invention relates to a control device for a flash device used for a camera of the kind which automatically adjusts the amount of light emission by the flash device in such a way as to give an apposite exposure.

2. Description of Related Art

Flash-device control systems included in camera systems for performing exposure actions by emitting light toward an object of shooting and automatically adjusting the amount of light emission for an apposite exposure have variously been developed. These known flash-device control systems generally employ a so-called TTL light control method by which an apposite amount of light emission is obtained by measuring light reflected by a film surface after arrival of light at the film surface at the time of exposure.

Further, some of these known flash-device control systems have been developed to solve a problem which is peculiar to a focal plane shutter and lies in that a flash synchronizing time is limited as the focal plane shutter makes a slit exposure for a high shutter speed. According to this solution, preliminary light emission is made before exposure and the amount of emission of main light emission is computed on the basis of a measured value of light obtained at the time of the preliminary light emission and another measured value of light obtained immediately before the preliminary light emission.

In the system which makes the preliminary light emission before exposure and computes the amount of emission of the main light emission on the basis of a measured light value obtained at the time of the preliminary light emission and a measured light value obtained immediately before the preliminary light emission, measurement of light is performed by a light measuring sensor which is not located on the optical axis. Therefore, in order to obtain a correct measured light value, it is necessary to transmit information on the full-open aperture value of a photo-taking lens to the camera. However, in a case where the full-open aperture value of the photo-taking lens is unknown, such as a case where a bellows or an intermediate ring is interposed in between the photo-taking lens and the camera, it is hardly possible to obtain a correct measured light value. The operation of the system then tends to result in an underexposure or an overexposure.

BRIEF SUMMARY OF THE INVENTION

In accordance with one aspect of the invention, there is provided a control device for a flash device used for a camera, or a camera adapted to use a flash device, which comprises object luminance detecting means for making preliminary light emission before exposure and measuring object luminance obtained during the preliminary light emission, aperture value determining means for determining a full-open aperture value of a photo-taking lens used for the camera, deciding means for deciding an amount of light emission to be made by the flash device during exposure by the camera, in accordance with a detection result of the object luminance detecting means and a determination result of the aperture value determining means, and restraining means for finding whether the camera is in such a state as to have the full-open aperture value correctly determined by the aperture value determining means and, if the camera is found to be not in such a state as to have the full-open aperture value correctly determined by the aperture value determining means, restraining light-emission control of the flash device based on a decision of the deciding means from being performed. By virtue of this arrangement, in the flash-device control device or the camera having the flash-device control device and having the deciding means for deciding the amount of light emission from the flash device for photo-taking according to the object luminance obtained at the time of the preliminary light emission and the full-open aperture value of the photo-taking lens used for the camera, the light-emission control based on the amount of light emission decided by the deciding means is restrained from being performed, in the event of a state in which the aperture value cannot be correctly determined.

The above and other aspects and features of the invention will become apparent from the following detailed description of a preferred embodiment thereof taken in conjunction with the accompanying drawings.

DETAILED DESCRIPTION OF THE INVENTION

Hereinafter, a preferred embodiment of the invention will be described in detail with reference to the drawings.

FIGS. 1 to 7 relate to a camera system according to the embodiment of the invention.

Figure 1:
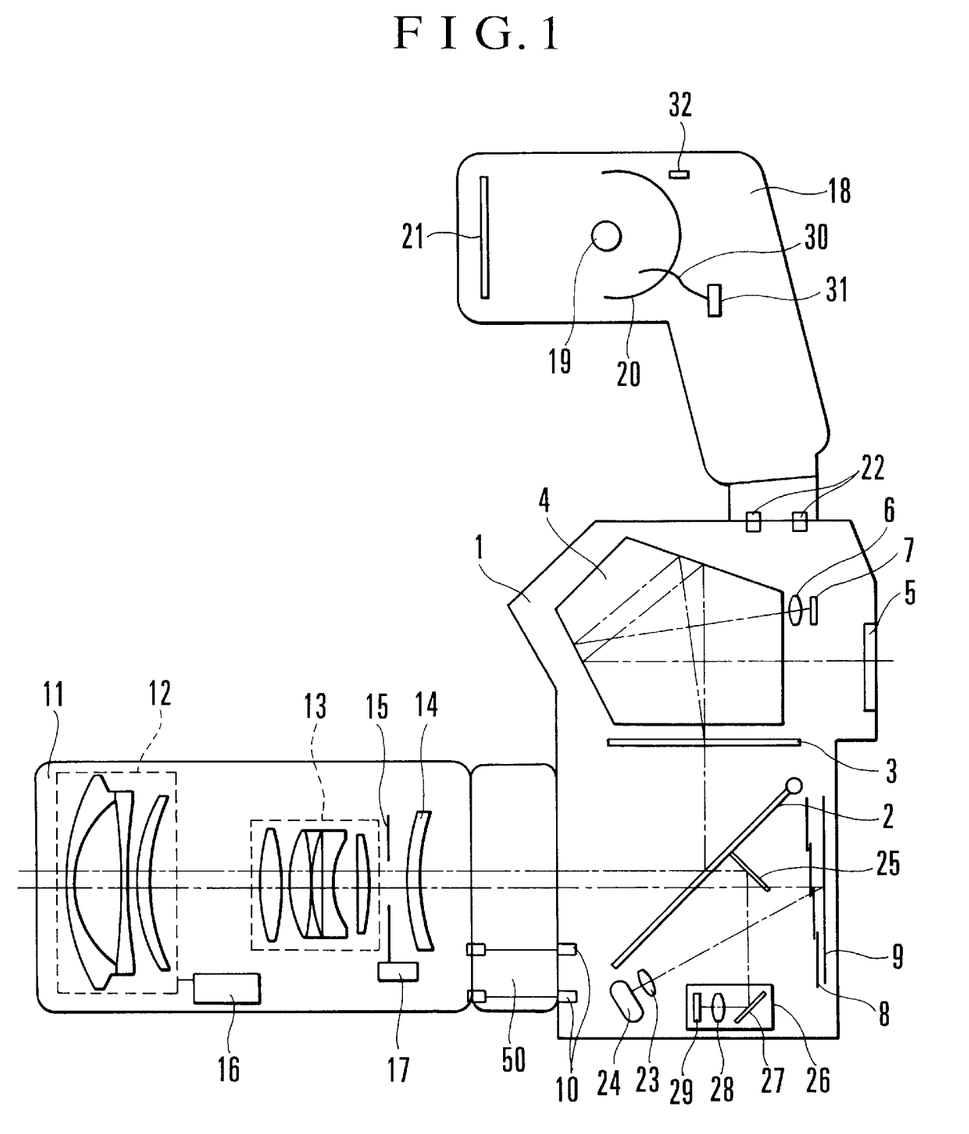
FIG. 1 is a side sectional view showing a camera system, according to an embodiment of the invention, in a state of having an intermediate ring mounted thereon.
Figure 2:
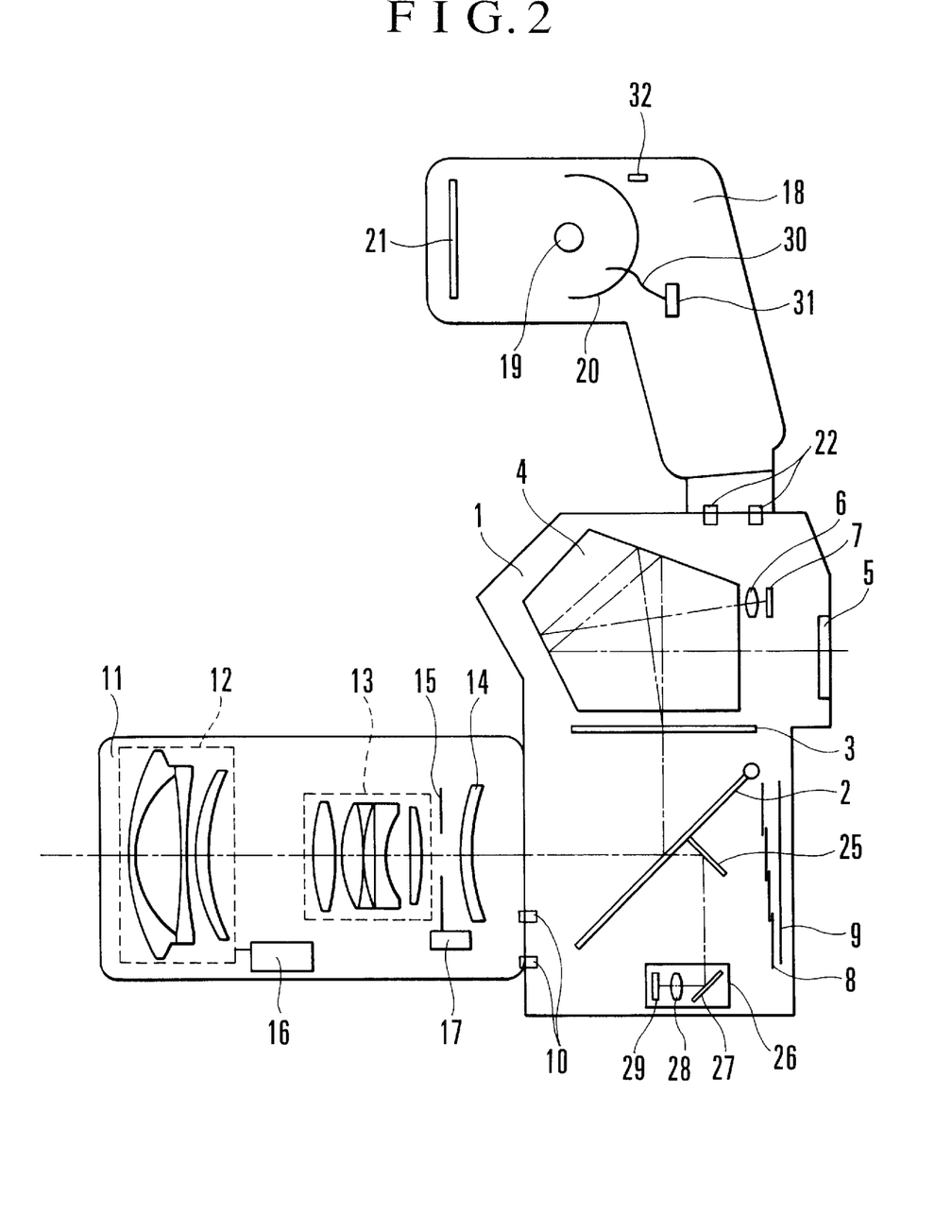
FIG. 2 is a side sectional view showing the camera system, according to the embodiment of the invention, with the intermediate ring not mounted thereon.

FIGS. 1 and 2 are sectional views mainly showing the optical arrangement of the camera system, which is a single-lens reflex camera capable of controlling a flash device. FIG. 1 is a side sectional view showing the camera system in a state of having an intermediate ring mounted between a camera body and a photo-taking lens. FIG. 2 is a side sectional view showing the camera system in a state obtained with the intermediate ring not mounted between the camera body and the photo-taking lens. All members appearing both in FIGS. 1 and 2 in common are indicated respectively with the same reference numerals.

Referring to FIGS. 1 and 2, a camera body 1 contains therein various optical parts, mechanical parts, electric circuits, a film, etc., to perform photo-taking operations. A main mirror 2 is arranged to be obliquely inserted into or retracted from a photo-taking optical path according to whether the camera is in an observing state or in a phototaking state. The main mirror 2 is semi-transparent and allows about one half of the quantity of light coming from a shooting object to be transmitted therethrough toward a focus detecting optical system (which will be described later herein). A focusing screen 3 is disposed on a predetermined imaging plane of a photo-taking lens (lens groups 12 to 14). A pentagonal roof prism 4 is provided for changing an optical path for a viewfinder 5. The viewfinder 5 has a window to permit the photographer of the camera system to observe a photo-taking picture plane through the focusing screen 3. An imaging lens 6 and a multidivisional light measuring sensor 7 are provided for measuring the object luminance within the observation picture plane. The imaging lens 6 is arranged to make the focusing screen 3 conjugate to the multidivisional light measuring sensor 7 through a reflection optical path within the pentagonal roof prism 4.

Figure 3:
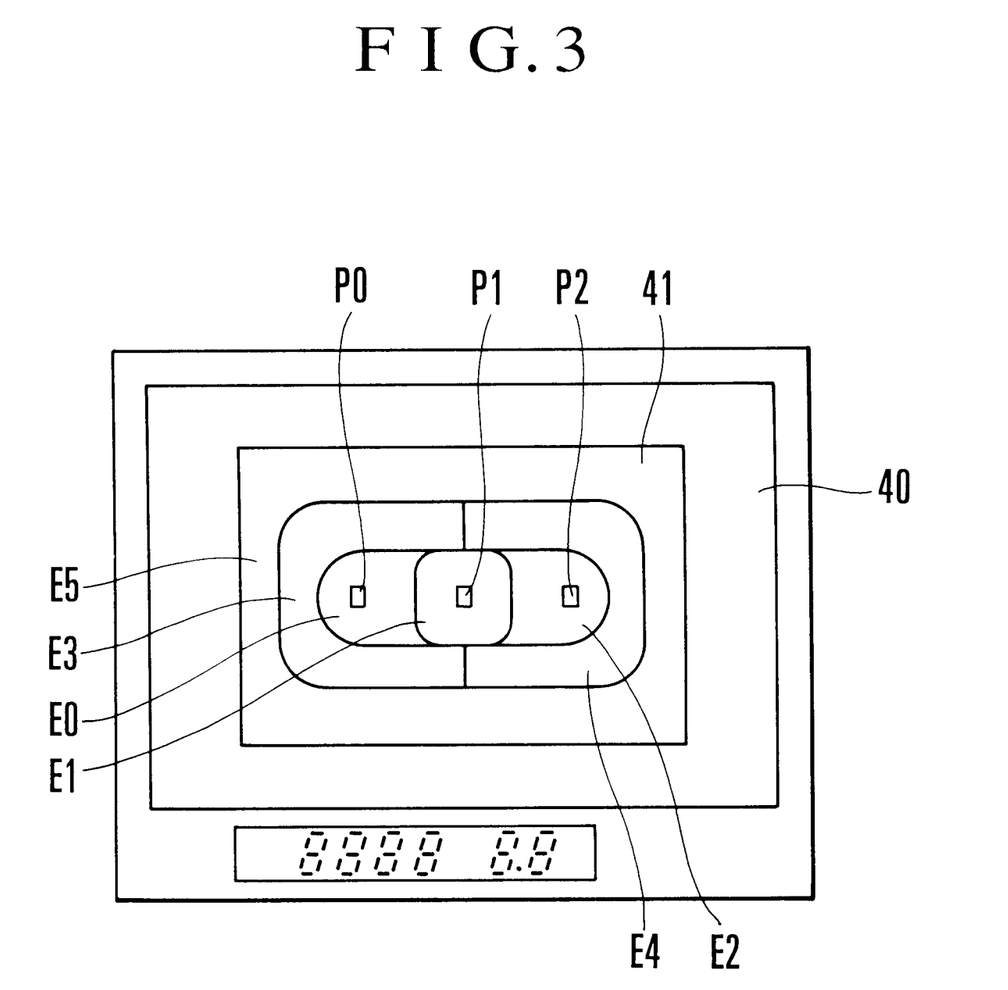
FIG. 3 shows the arrangement of a viewfinder of the camera shown in FIG. 1.

The function of the multidivisional light measuring sensor 7 is next described in detail as follows. A light measuring area on the photo-taking picture plane is divided as shown in FIG. 3. In FIG. 3, reference numeral 40 denotes the whole photo-taking picture plane. A light measuring area 41 of the light measuring sensor 7, as appearing on the photo-taking picture plane 40, is divided into six areas, i.e., areas E0, E1, E2, E3, E4 and E5. The multidivisional light measuring sensor 7 which is made to be conjugate to the photo-taking picture plane is thus arranged to be capable of measuring the luminance of each divided area of the photo-taking picture plane and to output the result of light measurement for each of the divided areas.

Referring again to FIG. 1, reference numeral 8 denotes a shutter, and reference numeral 9 denotes a photosensitive member such as a silver-halide film.

An imaging lens 23 and a light control sensor 24 are arranged to measure light reflected by the surface of the film 9 during exposure. The amount of emission from a flash device 18 during exposure is controlled by measuring, with the light control sensor 24, the amount of light reflected from the surface of the film 9, which light is coming from the object receiving the emitted flash light, and by stopping the light emission of the flash device when the measured amount of light is judged to have reached a predetermined amount. A sub-mirror 25 is arranged to guide rays of light from the object to a focus detecting unit 26 by bending the rays of light downward.

The focus detecting unit 26 contains therein a secondary imaging mirror 27, a secondary imaging lens 28, a focus detecting line sensor 29, etc. The secondary imaging mirror 27 and the secondary imaging lens 28 constitute a focus detecting optical system, which forms a secondary imaging plane of the photo-taking optical system on the focus detecting line sensor 29. The focus detecting unit 26 is an automatic focus detecting device arranged to detect the state of focus on the object within the photo-taking picture plane in accordance with a known phase-difference detecting method by the processes of electric circuits which will be described later and to control a focus adjusting mechanism of the photo-taking lens according to the state of focus detected. The automatic focus detecting device detects the focus states of predetermined three focus detecting points P0, P1 and P2 arranged within the picture plane as shown in FIG. 3.

Mount contacts 10 are arranged in a known manner to serve as an interface between the camera and the lens. A switch SW3 (not shown in FIGS. 1 and 2) is also disposed at the mount contact 10. The switch SW3 is in an on-state when the photo-taking lens is mounted on the camera, and in an off-state when the photo-taking lens is not mounted or a bellows, an intermediate ring, a reverse adapter or the like is mounted.

Reference numeral 11 denotes a lens barrel arranged to be mounted on the camera body 1. The lens groups 12 to 14 are included in the lens barrel 11. The first lens group 12 is arranged to be movable along an optical axis for adjustment of focus position on the photo-taking picture plane. The second lens group 13 is arranged to be movable along the optical axis for varying the focal length of the photo-taking lens to vary a magnification on the photo-taking picture plane. The third lens group 14 is stationary. A diaphragm 15 for the photo-taking lens is also included in the lens barrel 11.

A first-lens-group driving motor 16 is arranged to move the first lens group 12 along the optical axis according to an automatic focusing action so as to automatically adjust the position of focus of the photo-taking lens. A lens-diaphragm driving motor 17 is arranged to drive the diaphragm 15 of the photo-taking lens to fully open or stop down the aperture of the photo-taking lens.

The flash device 18 is externally mounted on the camera body 1 and is arranged to emit flash light under the control of signals from the camera. A xenon lamp 19 is arranged to convert electric current energy into light emission energy. A reflection plate 20 and a Fresnel lens 21 are arranged to efficiently converge the light emission energy toward the object of shooting. Accessory shoe contacts 22 are arranged in a known manner to serve as an interface between the camera body and the external flash device 18.

A glass fiber piece 30 is arranged to lead the light emitted by the xenon lamp 19 to a monitoring sensor (PD1) 31. The sensor (PD1) 31 is provided for directly measuring the amounts of emission of the preliminary light emission and the main light emission of the flash device 18 and functions as a sensor for control over the amount of emission of the main light emission.

A sensor (PD2) 32 is provided for monitoring the light emitted by the xenon lamp 19 and functions as a sensor for control over the flat light emission of the flash device 18 by limiting the light emission current of the xenon lamp 19 according to the output of the sensor (PD2) 32.

An intermediate ring 50 is arranged to be mounted on the camera body 1 for the purpose of increasing a magnification of photo-taking of an object. The intermediate ring 50 is characterized in that no lens is included therein and that the mounting of the intermediate ring 50 does not electrically cause the lens mount detecting switch SW3 to turn on.

In FIGS. 1 and 2, only optical and mechanical members of the camera system are shown, while electric circuit members necessary also for the camera system are omitted.

Figure 4:
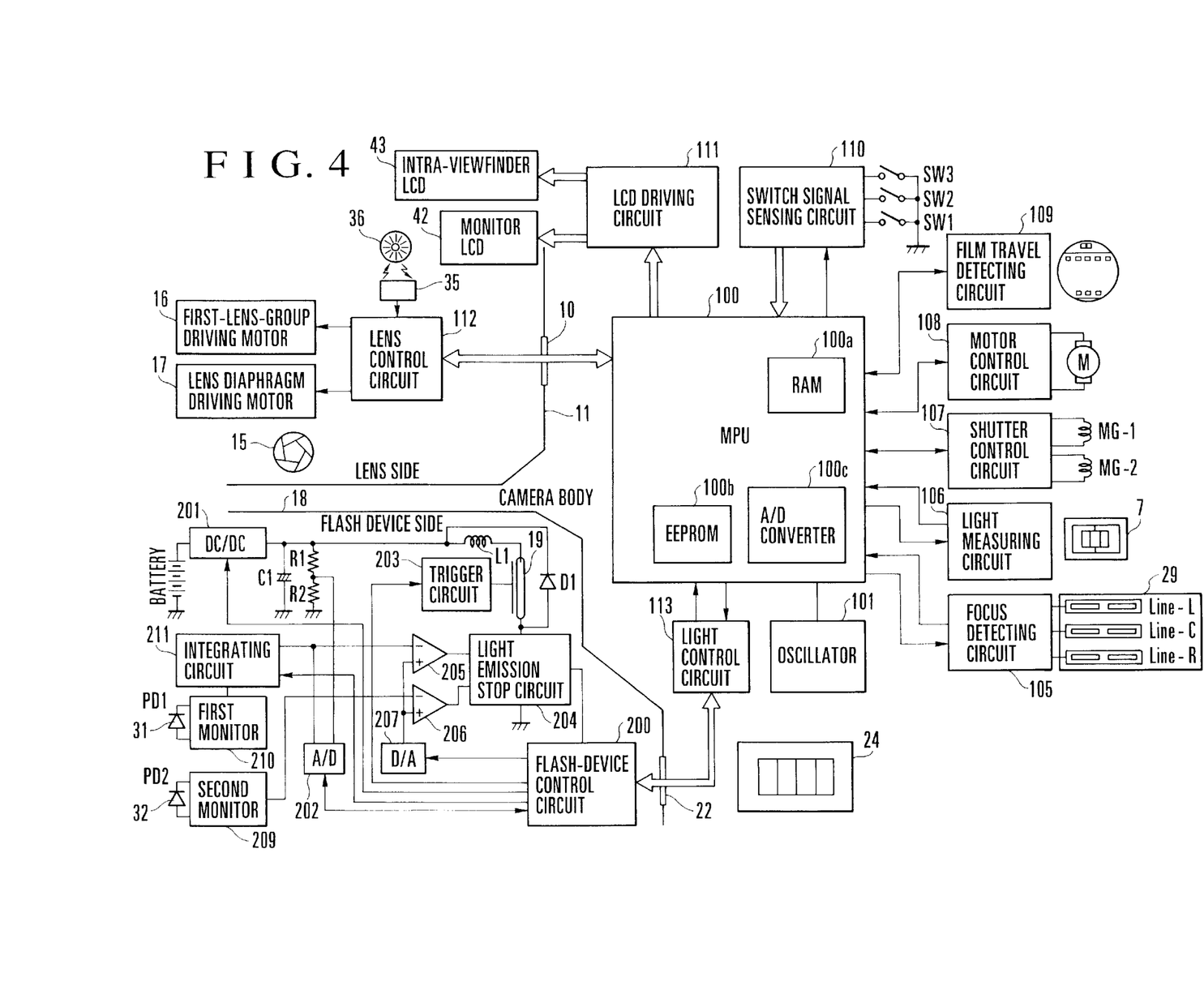
FIG. 4 is a block diagram showing an electrical circuit arrangement of the camera shown in FIG. 1.

FIG. 4 is a block diagram showing the electric circuitry of the camera system according to the embodiment of the invention. In FIG. 4, all members corresponding to those shown in FIG. 1 are indicated by the same reference numerals and symbols as in FIG. 1.

Referring to FIG. 4, an MPU 100 performs its internal actions on the basis of a clock signal generated by an oscillator 101. Within the MPU 100, a RAM 100a is arranged to store information necessary for actions as a camera and also to temporarily store parameters sent from the lens barrel 11 and the flash device 18. An EEPROM 100b is capable of storing information on the count value of a film counter and other photo-taking information. An A/D converter 100c is arranged to A/D convert analog-signals received from a focus detecting circuit 105 and a light measuring circuit 106. The MPU 100 sets the camera system into various states by processing the A/D-converted values of these signals.

To the MPU 100 are connected the focus detecting circuit 105, the light measuring circuit 106, a shutter control circuit 107, a motor control circuit 108, a film travel detecting circuit 109, a switch signal sensing circuit 110 and an LCD driving circuit 111. The MPU 100 is arranged to send signals to a lens control circuit 112 disposed within the photo-taking lens through the mount contacts 10 and to a flash-device control circuit 200 of the external flash device 18 through the accessory shoe contacts 22.

The line sensor 29 is a known CCD line sensor composed of three pairs of line sensors Line-L, Line-C and Line-R which correspond to the three focus detecting points P0, P1 and P2 of the above-stated viewfinder. The focus detecting circuit 105 is arranged to control the charge storing action and reading action of the line sensor 29 to obtain pixel information from the line sensor 29. The pixel information is sent to the MPU 100.

The MPU 100 A/D-converts the pixel information to detect focus by the known phase-difference detecting method. The MPU 100 then adjusts the focus of the photo-taking lens by exchanging signals with the lens control circuit 112 according to the focus detection information thus obtained.

The light measuring circuit 106 is arranged to obtain the output of the multidivisional light measuring sensor 7 which has the six areas obtained by dividing the picture plane as mentioned above. The output of the light measuring sensor 7 thus obtained is sent to the MPU 100 as a luminance signal indicating the luminance of each of the divided areas of the picture plane. The light measuring circuit 106 obtains the luminance signals both in a normal state in which the preliminary light emission is not made from the flash device 18 toward the object and in a state of having the preliminary light emission made from the flash device 18 toward the object. At the MPU 100, these luminance signals are A/D-converted and are used for the operation of computing an aperture value and a shutter speed for adjusting exposure and for the operation of computing an amount of emission of the main light emission from the flash device 18 during exposure.

The shutter control circuit 107 is arranged to perform an exposure action by allowing a leading shutter blade (MG-1) and a trailing shutter blade (MG-2) to travel according to signals from the MPU 100. The motor control circuit 108 is arranged to move the main mirror 2 upward and downward, to charge the shutter 8 and to transport the film by controlling the motor according to signals coming from the MPU 100. The film travel detecting circuit 109 is arranged to find if the film is wound up to an extent corresponding to one frame and sends a signal to the MPU 100 when the film for one frame is transported.

A switch SW1 is arranged to be turned on by the first stroke of operation on a release button (not shown). With the switch SW1 turned on, light measuring and AF actions begin to be performed. A switch SW2 is arranged to be turned on by the second stroke of operation on the release button. With the switch SW2 turned on, an exposure action begins. The switch signal sensing circuit 110 detects the signals of the switches SW1 and SW2 and other camera operation members (not shown) and sends them to the MPU 100.

The LCD driving circuit 111 is arranged to control displays to be made by an intra-viewfinder LCD 43 and a monitor LCD 42 in accordance with signals from the MPU 100.

The lens control circuit 112 is arranged to communicate with the MPU 100 via the lens mount contacts 10 and to control the focus adjustment of the photo-taking lens and the aperture of the diaphragm 15 by actuating the first-lens-group driving motor 16 and the lens-diaphragm driving motor 17. A photodetector 35 and a pulse disk 36 are arranged to jointly enable the lens control circuit 112 to obtain information on the position of the first lens group 12 for adjusting the focus of the photo-taking lens by counting the number of pulses. The lens control circuit 112 obtains, from the information on the position of the first lens group 12, information on an absolute distance to the object and transmits the absolute distance information to the MPU 100. Information on a full-open aperture value and a focal length of the photo-taking lens is transmitted from the lens control circuit 112 to the MPU 100 through the lens mount contacts 10.

A light control circuit 113 is composed of the light control sensor 24 and a communication circuit for communication with the flash device 18. The light control sensor 24 is arranged to begin to perform a charge storing action the instant the flash device 18 begins to emit light. The light control circuit 113 sends a light emission stop signal to the flash device 18 when the output of the light control sensor 24 reaches a predetermined value.

The flash-device control circuit 200 is arranged to cause the flash device 18 to emit light toward the object in accordance with a signal from the MPU 100 and is able to control the amount of emission, the peak value of the flat light emission, the light emission time, etc., of the flash device 18.

A DC/DC converter 201 is capable of allowing a main capacitor C1 of the flash device 18 to store about 300 V by boosting the voltage of a battery in accordance with a command of the flash-device control circuit 200. Voltage dividing resistors R1 and R2 are provided for enabling the flash-device control circuit 200 to monitor the voltage of the main capacitor C1. The flash-device control circuit 200 indirectly monitors the voltage of the main capacitor C1 by causing an A/D converter 202 to A/D-convert a voltage obtained through the voltage dividing resistors R1 and R2. The flash-device control circuit 200 is thus arranged to be capable of stopping the DC/DC converter 201 to bring a voltage boosting action to a stop and monitoring the current level of the charging voltage to transmit information on the charging voltage to the MPU 100.

A trigger circuit 203 is arranged to output a trigger signal through the flash-device control circuit 200 according to a command of the MPU 100 at the time of an exposure. The trigger signal causes a high voltage to be generated at the xenon lamp 19 and electric charge energy stored in the main capacitor C1 to be discharged through the xenon lamp 19. This causes the flash device 18 to begin to emit light.

A light emission stop circuit 204 is arranged to be in an on-state when the trigger signal is outputted. In the case of a known TTL light control process, after the commencement of the light emission, the MPU 100 sends a light emission stop signal to the flash-device control circuit 200 when the output of the light control circuit 113 reaches a predetermined value. The flash-device control circuit 200 then sends the light emission stop signal to the light emission stop circuit 204. Upon receipt of the light emission stop signal, the light emission stop circuit 204 turns off to bring the light emission by the xenon lamp 19 to a stop.

The circuit arrangement is described further below along with the description of the actions of the flash device 18 to be performed in the camera system which performs the preliminary light emission and controls the amount of emission of the main light emission on the basis of a light value measured during the preliminary light emission.

<Flat Light Emission>

The flash-device control circuit 200 sets a predetermined value at a D/A converter 207. At this point of time, the xenon lamp 19 has not yet begun to emit light. Therefore, the monitoring sensor (PD2) 32 for the flat light emission has a little photoelectric current. Accordingly, the output of a second monitor circuit 209 which is supplied to the inverted input terminal of a comparator 206 is at a low level. The comparator 206, therefore, sends a high level output to the light emission stop circuit 204.

When the trigger signal is outputted from the trigger circuit 203, the xenon lamp 19 begins to emit light. The peak value of the light emission soon rises. The photoelectric current of the monitoring sensor (PD2) 32 increases to raise the level of output of the second monitor circuit 209. Then, the output level of the comparator 206 becomes low.

The low level of the output of the comparator 206 renders the light emission stop circuit 204 operative to cut off the discharge loop of the xenon lamp 19. A diode D1 and a coil L1 then form a circulating current loop to cause the peak value of the light emission to gradually decrease and not to promptly drop.

When the peak value comes to decrease, the photoelectric current of the monitoring sensor (PD2) 32 also decreases to cause the output level of the comparator 206 to become high. With the level of the output of the comparator 206 becoming high, a discharge loop of the xenon lamp 19 is formed to cause the peak value to rise. The output of the comparator 206 thus causes the peak value to repeatedly increase and decrease in a short cycle. As a result, the control over the flat light emission is performed to have the light emission made approximately at a constant peak value. The flat light emission is terminated by the flash-device control circuit 200 by sending the light emission stop signal directly to the light emission stop circuit 204.

The peak value of the flat light emission is controlled to be at a desired value by varying a voltage input to a non-inverted input terminal of the comparator 206 by applying a digital value to the D/A converter 207 in such a way as to vary the acting point of the photoelectric current of the monitoring sensor (PD2) 32. The time of the flat light emission also can be controlled to a desired time by the flash-device control circuit 200.

<Preliminary Light Emission and Integration>

For the preliminary light emission, the above-stated flat light emission is performed at a predetermined peak value for a predetermined period of time. At that time, the monitoring sensor (PD1) 31 measures the luminance of light emission from the xenon lamp 19. The flash-device control circuit 200 instructs an integrating circuit 211 to begin its integrating action on the preliminary light emission through the output of a first monitor circuit 210.

Further, to the light emission stop circuit 204 is supplied the output of the comparator 205 which has the output of the integrating circuit 211 inputted to its inverted input terminal. In the flat light emission mode, however, the signal from the comparator 205 is arranged to be ignored to prevent it from hindering the above-stated control over the flat light emission.

Upon completion of the preliminary light emission, the flash-device control circuit 200 causes the A/D converter 202 to A/D-convert the output of the integrating circuit 211 which indicates an integral value obtained by integrating the preliminary light emission. The integral value thus can be read in a digital value.

<Control of Main Light Emission>

The MPU 100 obtains an apposite integral value of the amount of emission of the main light emission from the above-stated integral value of the preliminary light emission, the luminance value of reflected object light obtained from the multidivisional light measuring sensor 7 during the preliminary light emission, etc. Then, the apposite integral value thus obtained is set at the D/A converter 207 through the flash-device control circuit 200.

For the main light emission, the integrating circuit 211 is initialized and the trigger circuit 203 is caused to trigger the main light emission.

The luminance of light emission of the xenon lamp 19 measured by the monitoring sensor (PD1) 31 is integrated by the integrating circuit 211. When the integral output of the integrating circuit 211 reaches the set apposite integral value, the level of the output of the comparator 205 changes from a high level to a low level to cause the light emission stop circuit 204 to bring the light emission to a stop. Further, in the main light emission mode, the output of the comparator 206 is set to be ignored by the signal from the flash-device control circuit 200. In the above manner, the amount of emission of the main light emission can be controlled to an apposite amount of emission obtained by the computing operation.

Figure 5:
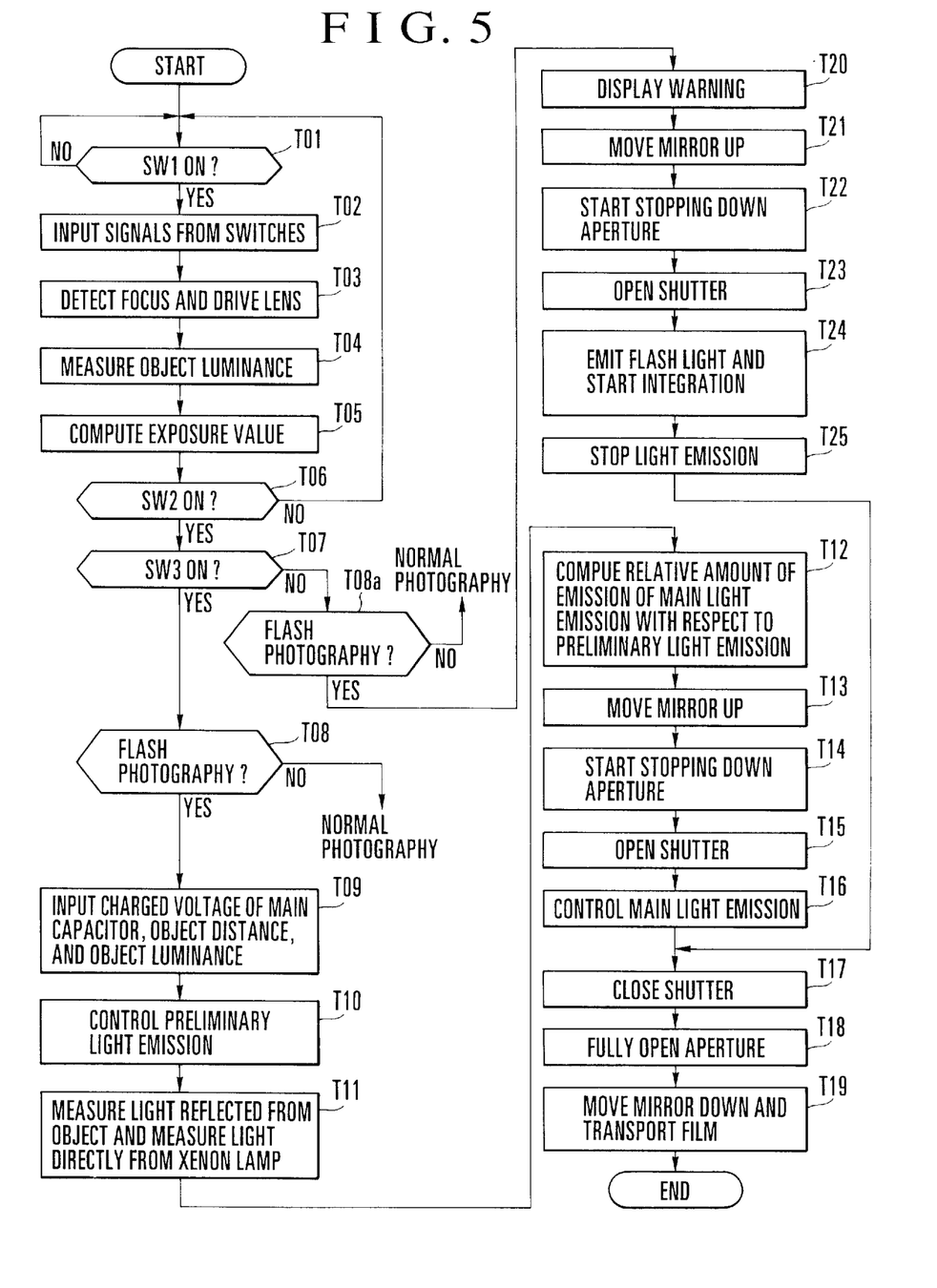
FIG. 5 is a flow chart showing an operation of the camera shown in FIG. 1.
Figure 6A:
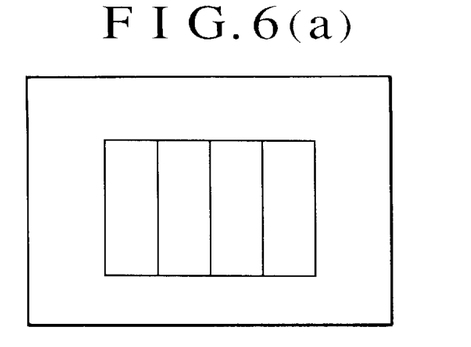
FIGS. 6(a) to 6(d) show the manner of division of a TTL light control sensor included in the camera shown in FIG. 1.
Figure 6B:
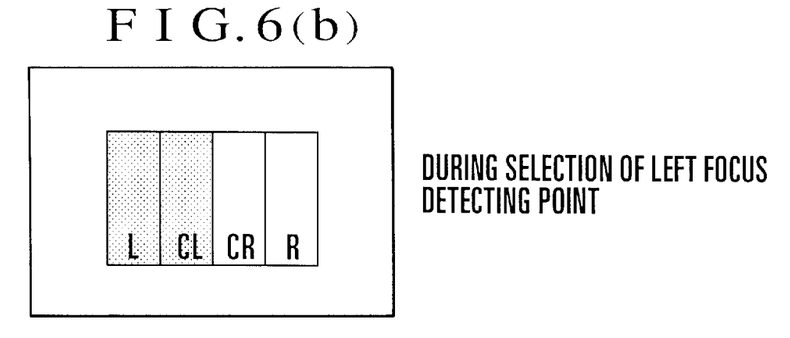
Figure 6C:
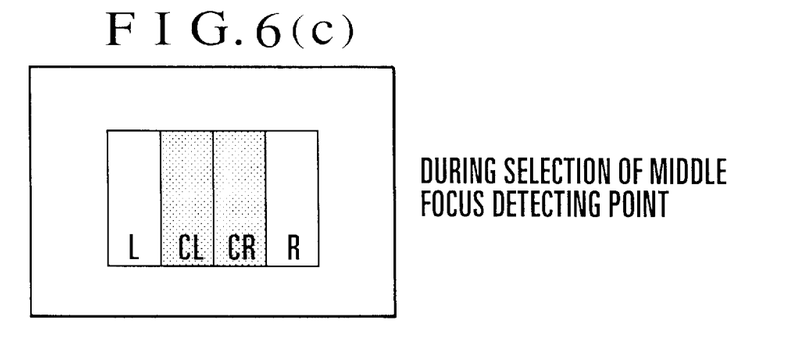
Figure 6D:
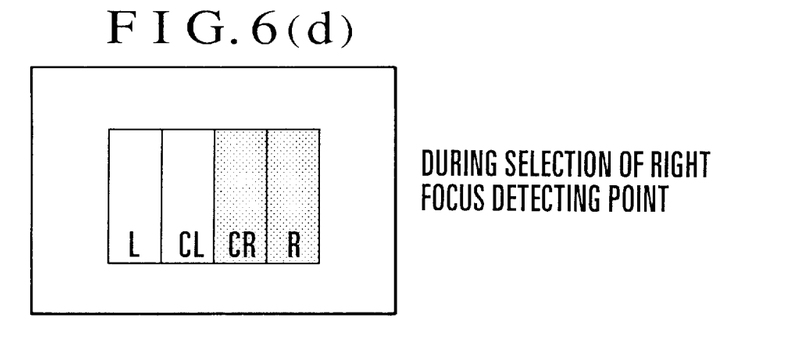

The operation of the camera system according to the embodiment of the invention is next described with reference to FIG. 5. FIG. 5 is a flow chart showing a flow of operation which is centered on the actions of the MPU 100.

At a step T01 of FIG. 5, when the switch SW1 which is arranged to be turned on by the first stroke of operation on the release button is found to be turned on, the flow of operation proceeds to a step T02.

At the step T02, information on the position of each of other operation switches of the camera which are not shown is read from the switch signal sensing circuit 110. Then, various photo-taking modes are set with respect to how to decide a shutter speed or how to decide an aperture value, etc. The switches connected to the switch signal sensing circuit 110 include, among others, the light and distance measurement start switch SW1, the release start switch SW2 and the lens mounting detecting switch SW3. The switch SW3 is arranged to be in an on-state when the photo-taking lens is mounted on the camera body, and in an off-state when the photo-taking lens is not mounted or when the intermediate ring, the reverse adapter or the like is mounted on the camera body.

Further, in a case where the lens or the flash device is mounted on the camera body, the camera conducts data communication with the lens or the flash device. The lens transmits information about a full-open aperture value, a focal length, an absolute distance, etc., to the camera body. The flash device transmits information about completion of a charging process and a guide number to the camera body. Information about the focal length of the lens is transmitted to the flash device. The necessary information is then stored in the RAM 100a or, if necessary, in the EEPROM 100b disposed within the MPU 100.

At a step T03, a focus detecting action is performed by the focus detecting circuit 105 according to the known phase-difference detecting method mentioned in the foregoing. The MPU 100 controls and causes the lens control circuit 112 to adjust the focus of the photo-taking lens. As mentioned in the foregoing with reference to FIG. 3, there are three focus detecting points on the picture plane. The camera system can be arranged either to let the photographer to select any of objects of these three points for focusing or to automatically select any of these three points in a known automatic selecting algorithm on the basis of the so-called near-point priority concept.

At a step T04, object luminance values of the six areas on the picture plane are obtained from the light measuring circuit 106. At this time, the object luminance value of each area is corrected on the basis of information on the full-open aperture value of the photo-taking lens.

At a step T05, the amount of exposure is decided by a known algorithm on the basis of the above-stated object luminance values of the six areas, and a shutter speed and an aperture value are decided according to the photo-taking mode set.

At a step T06, a check is made to find if the switch SW2 is in an on-state. If not, the steps T01 to T06 are repeated. If the switch SW2 is found to be in an on-state, the flow proceeds to a step T07.

At the step T07, a check is made for the state of the switch SW3 through the switch signal sensing circuit 110 to find if the photo-taking lens is mounted on the camera body. If so, the flow proceeds to a step T08. If not, the flow proceeds to a step T08a.

At the step T08 or T08a, a check is made to find if flash photography is selected. If not, a normal photo-taking operation is performed. If so, the flow proceeds from the step T08 to a step T09 or from the step T08a to a step T20.

At the step T09, information on the current charging voltage of the main capacitor C1 of the flash device 18 is obtained from the flash-device control circuit 200, information on an absolute distance from the camera to the object is obtained from the lens control circuit 112, and information on the luminance of the object is obtained from the light measuring circuit 106. Then, in the same manner as at the step T04, the object luminance value of each area is corrected on the basis of information on the full-open aperture value of the photo-taking lens.

At a step T10, the MPU 100 computes the amount of emission of the preliminary light emission on the basis of information on the charging voltage, the absolute distance and the object luminance obtained at the step T09, and then instructs the flash-device control circuit 200 to control the preliminary light emission to give the computed amount of light emission.

At a step T11, the MPU 100 measures light reflected from the object by means of the multidivisional light measuring sensor 7 at the same time as the preliminary light emission. At this step, the object luminance value of each of the divided areas is also corrected on the basis of the full-open aperture value of the photo-taking lens, similarly to the step T04 or T10. Thus, the luminance of the object is also measured by the multidivisional light measuring sensor 7 immediately before the preliminary light emission. This light measuring action is performed for the purpose of obtaining only a preliminary light emission component of light reflected by the object by subtracting a value of light measured immediately before the preliminary light emission from the light value measured at the time of the preliminary light emission.

Further, while the preliminary light emission is in process, the flash-device control circuit 200 measures light directly emitted from the xenon lamp 19 by means of the monitoring sensor (PD1) 31. The light directly measured is integrated by the integrating circuit 211 and an integral value thus obtained is read by A/D-converting it upon termination of the preliminary light emission.

At a step T12, an apposite integral value of the main light emission is computed and obtained from the integral value of the preliminary light emission, the measured value of the object-reflected light of the preliminary light emission, an exposure value, etc.

At a step T13, the main mirror 2 is moved up and is retracted from a photo-taking optical path together with the sub-mirror 25 prior to the exposure action.

At a step T14, the lens control circuit 112 is instructed to control the photo-taking lens to have an aperture value based on the decided amount of exposure.

At a step T15, the shutter control circuit 107 is instructed to cause the leading blade of the shutter 8 to travel by energizing the magnet MG-1 which is provided for causing the leading shutter blade to travel.

At a step T16, the main light emission of the flash device 18 is controlled by the flash-device control circuit 200 in association with the driving action on the shutter 8. The main light emission is controlled according to the amount of light emission computed at the step T12.

At a step T17, to attain the decided shutter speed by the travel of the trailing blade of the shutter 8, the shutter control circuit 107 is instructed to allow the trailing shutter blade to travel by energizing the magnet MR-2 which is provided for causing the trailing shutter blade to travel.

At a step T18, to attain the full-open aperture value of the photo-taking lens, the MPU 100 instructs the lens control circuit 112 to fully open the diaphragm 15. Upon completion of the exposure action, the flow proceeds to a step T19.

At the step T19, the main mirror 2 and the sub-mirror 25 which have been retracted from the photo-taking optical path are moved down to obliquely set them again within the photo-taking optical path. The motor control circuit 108 and the film travel detecting circuit 109 are caused to wind up the film to an extent corresponding to one frame. Then, the operation of the camera system according to the embodiment comes to an end.

In a case where the switch SW3 is found at the step T07 to be in an off-state, i.e., a case where the full-open aperture value of the photo-taking lens is unknown, the flow proceeds to the step T08a. If the flash photography is found at the step T08a to be selected, the flow proceeds to the step T20.

At the step T20, since the full-open aperture value of the photo-taking lens 11 is unknown, a warning display is made to indicate that the photo-taking mode has been changed by the camera as the photo-taking condition set by the photographer cannot be carried out. The MPU 100 then causes the LCD driving circuit 111 to drive both the intra-viewfinder LCD 43 and the monitor LCD 42 to make this warning display.

At a step T21, the main mirror 2 is moved up and retracted from the photo-taking optical path together with the sub-mirror 25 prior to the exposure action.

At a step T22, the MPU 100 instructs the lens control circuit 112 to control the photo-taking lens to have a set aperture value.

At a step T23, the MPU 100 instructs the shutter control circuit 107 to allow the leading shutter blade to travel by energizing the magnet MG-1 which is provided for the travel of the leading shutter blade.

At a step T24, the flash device 18 is caused to make the main light emission while the exposure action is in process in association with the driving action on the shutter 8. At the same time, the light control sensor 24 is caused to begin performing the integrating action.

The light control sensor 24 is configured as shown in FIG. 6(*a*) to have four divided sensor areas to which weight is attached according to the location of the focus detecting point. The light control action is performed at two areas L and CL when the focus detecting point is located on the left side as shown in FIG. 6(*b*), at two areas CL and CR when the focus detecting point is located in the middle part as shown in FIG. 6(*c*), and at two areas CR and R when the focus detecting point is located on the right side as shown in FIG. 6(*d*).

At a step T25, when an integral value obtained at the step T24 reaches a predetermined value, the flash-device control circuit 200 is instructed to bring the light emission to a stop. The flow then proceeds to the step T17.

Figure 7:
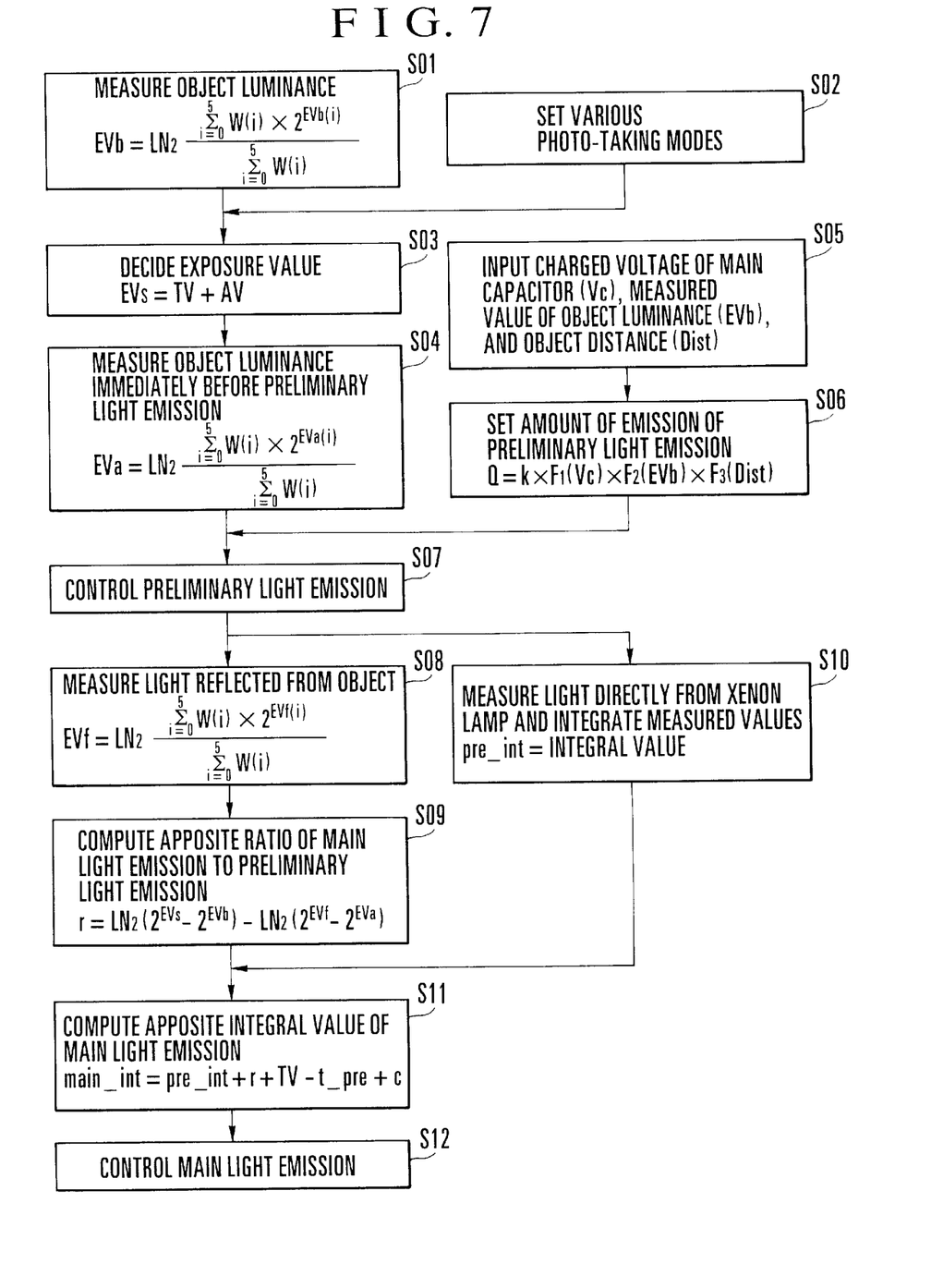
FIG. 7 is a flow chart showing computing operations of the camera shown in FIG. 1 for obtaining an apposite amount of emission of main light emission on the basis of preliminary light emission and for obtaining an amount of emission of the preliminary light emission.

FIG. 7 shows in a flow chart the formulas of computing operations to be carried out by the camera system for obtaining an apposite amount of emission of the main light emission on the basis of the value of light measured when the preliminary light emission is made and a flow of operation of parts computing the amount of emission of the main light emission and that of the preliminary light emission.

At a step S01 of FIG. 7, which corresponds to the step T04 of FIG. 5, the luminance of the object obtained under natural light is measured and a weighted mean of luminance values of the six areas is obtained.

A weighting coefficient W(i) varies according to the light measuring mode of control over the main light emission of the flash device and the focus detecting point of the automatic focus detection and is set, for example, as shown in Table 1 below.

TABLE 1

| | w(i) | | | | | | |
|---|---|---|---|---|---|---|---|
| | weighted averaging light measurement | | | partial light measurement | | | |
| i | P0 | P1 | P2 | P0 | P1 | P2 | ←※ |
| 0 | 7 | 3 | 1 | 1 | 0 | 0 | |
| 1 | 3 | 7 | 3 | 0 | 1 | 0 | |
| 2 | 1 | 3 | 7 | 0 | 0 | 1 | |
| 3 | 3 | 1 | 1 | 0 | 0 | 0 | |
| 4 | 1 | 1 | 3 | 0 | 0 | 0 | |
| 5 | 1 | 1 | 1 | 0 | 0 | 0 | |

※: focus detecting points

According to Table 1 above, in a case where the light measuring mode of the control over the main light emission of the flash device is weighted averaging light measurement, the weighted mean is used by attaching weight to the focus detecting point of the automatic focus detection. When the light measuring mode is the partial light measurement, the weighting coefficient is used only for an area including the focus detecting point and the weighted mean is computed with zero weight attached to all other areas. As a result, the object luminance value EVb(i) of one area is used as the object luminance value EVb as it is. In averaging with weight, the weighted mean is obtained by expanding the power of 2 of a logarithmically compressed value of the luminance value EVb(i) of each area and, lastly, the weighted mean is logarithmically compressed at the bottom of 2. The object luminance value EVb obtained by this computing operation is used at a step S09 of computing the apposite ratio of the main light emission, which will be described later herein.

At a step S02 of FIG. 7, which corresponds to the step T02 of FIG. 5, various photo-taking modes such as a shutter speed priority mode, an aperture value priority mode and control values, etc., are inputted as desired by the photographer.

At a step S03, an exposure value EVs is decided by a combination of a shutter speed TV and an aperture value AV according to the inputted photo-taking mode, the control values and the object luminance value EVb(i).

$$EVs = TV + AV$$

This exposure value may be decided either by using the weighted mean value EVb obtained at the step S01 or by using a known computing algorithm for the split (partial) light measurement.

At a step S04, which corresponds to the step T09 of FIG. 5, the object luminance obtained immediately before the preliminary light emission is measured and a weighted mean is obtained. The method of this computing operation is the same as that of the step S01. A computed value EVa thus obtained is used for computing an object-reflected light component that has resulted only from the preliminary light emission at the step S09 of computing the apposite ratio of the main light emission.

At a step S07, which corresponds to the step T10 of FIG. 5, the preliminary light emission is controlled. The amount of emission of the preliminary light emission is decided at steps S05 and S06.

At the step S05, which corresponds to the step T09 of FIG. 5, the charged voltage Vc of the main capacitor, the object luminance information EVb and the object distance information Dist are inputted. At the step S06, which corresponds to the step T10 of FIG. 5, the amount of emission Q of the preliminary light emission is computed by the following formula:

$$Q = k \times F(Vc) \times F_2(EVb) \times F_3(Dist)$$

At a step S08, which corresponds to the step T11 of FIG. 5, the luminance of reflected light from the object at the time of the preliminary light emission is measured and a weighted mean is obtained.

At a step S09, which corresponds to the step T12 of FIG. 5, the amount of emission of the main light emission apposite with respect to the preliminary light emission is computed by the following formulas:

$$r1 = LN_2(2^{EVs} - 2^{EVb}) - LN_2(2^{EVf} - 2^{EVa}) \quad (A)$$

$$r2 = EVs - 1.5 - LN_2(2^{EVf} - 2^{EVa}) + rV \quad (B)$$

In the first term of the formula (A), a difference between the exposure value EVs and the object luminance measured value EVb is obtained by expanding the power of 2 of them and, lastly, the difference is logarithmically compressed at the bottom of 2. By the first term, an amount of insufficiency of the object luminance under natural light for an exposure is computed. In other words, the amount of insufficiency is computed for the purpose of obtaining an apposite exposure by adding the luminance obtainable under flash light emission to the luminance obtained under natural light.

In the second term of the formula (A), a difference between the object-reflected light luminance EVf obtained at the time of the preliminary light emission and the object luminance EVa obtained immediately before the preliminary light emission is likewise obtained by likewise expanding these values and the difference is likewise compressed. By the second term, only the amount of object-reflected light of the preliminary light emission is obtained by subtracting the object luminance under natural light from the whole object-reflected light obtained at the time of the preliminary light emission.

The first term of the formula (B) is provided for a case where the value of the first term of the formula (A) is zero or less, i.e., a case where the exposure value EVs is less than the object luminance value EVb and an exposure can be appositely made without having recourse to the use of the flash device. In that case, a target light emission level is set at an amount of light emission which is lower by 1.5 steps than a control value. The setting of the amount of light emission lower by 1.5 steps is based on data obtained by actual photographing tests. The second term of the formula (B) is the same as that of the formula (A).

In each of the formulas (A) and (B), the second term is subtracted from the first term. The computing operation is thus performed in a compression system. In order to make an overall exposure apposite, the ratio of the amount of emission of the main light emission to that of the preliminary light emission is obtained by these formulas. This ratio shows by how much the main light emission must be increased or decreased with respect to the preliminary light emission.

After that, the larger of the two values r1 or r2 obtained by the formulas (A) and (B) is employed as a control value. The value r1 is thus used in the case of "EVs>EVf" and the value r2 is used in the case of "EVs≦EVf".

In other words, the value r2 is used when the object luminance is brighter than the control value and the value r1 is used when the object luminance is darker than the control value.

At a step S10, which corresponds to the step T11 of FIG. 5, an integral value obtained by directly measuring the amount of emission of the preliminary light emission of the xenon lamp 19 is set as "pre_int".

At a step S11, which corresponds to the step T12 of FIG. 5, an apposite integral value of the main light emission "main_int" is computed as follows:

$$\text{main\_int} = \text{pre\_int} + r + TV - t\_pre + c$$

wherein all variables are of a compression system.

While the shutter is open, a flat light emission is made at the peak value obtained by adding the ratio "r" obtained at the step S09 to the peak value of the preliminary light emission. However, since this flat light emission is to be converted into an integral value, a time factor of "(shutter time TV)–(preliminary light emission continuing time t_pre)" is added. Then, a correction coefficient "c" such as a light control correcting amount set by the photographer is added in the last place.

At a step S12, which corresponds to the step T16 of FIG. 5, the main light emission is controlled on the basis of the apposite integral value of the main light emission computed at the step S11.

The applications of the invention are not limited to single-lens reflex cameras but include cameras of other types such as lens-shutter cameras. The recording media usable according to the invention are not limited to silver-halide films but include a combination of an image sensor, such as a CCD, and a memory.

As described above, according to the embodiment of the invention, a camera system includes a first light control part which computes an amount of light emission on the basis of a value of luminance measured when the preliminary light emission is made prior to exposure and a value of luminance measured immediately before the preliminary light emission, and a second light control part which performs the so-called TTL light control. An advantage of the camera system lies in that, if the full-open aperture value of the photo-taking lens is unknown, like in a case where a bellows or an intermediate ring is mounted between the camera body and the photo-taking lens, the TTL light control is carried out, so that the light emission can be controlled to an apposite amount even in such a case.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The individual components shown in schematic or block form in the drawings are all well-known in the camera arts and their specific construction and operation are not critical to the operation or best mode for carrying out the invention.

The invention may be carried out by combining as necessary the embodiment or its technological elements described in the foregoing.

Further, the invention applies to cases where either the whole or a part of claims or the arrangement of the embodiment described forms one apparatus or is used in combination with some other apparatus or as a component element of an apparatus.

I claim:

1. A control device for a flash device used for a camera, said control device comprising:

object luminance detecting means for making preliminary light emission before exposure and measuring object luminance obtained during the preliminary light emission;

aperture value determining means for determining a full-open aperture value of a photo-taking lens used for the camera;

deciding means for deciding an amount of light emission to be made by the flash device during exposure by the camera, in accordance with a detection result of said object luminance detecting means and a determination result of said aperture value determining means; and restraining means for finding whether the camera is in such a state as to have the full-open aperture value correctly determined by said aperture value determining means and, if the camera is found to be not in such a state as to have the full-open aperture value correctly determined by said aperture value determining means, restraining light-emission control of the flash device based on a decision of said deciding means from being performed.

2. A control device according to claim 1, wherein said restraining means includes a means for, if the camera is found to be not in such a state as to have the full-open aperture value correctly determined by said aperture value determining means, causing the flash device to make light emission in accordance with a decision of a further deciding means for deciding the amount of light emission in a method different from said first-mentioned deciding means.

3. A control device according to claim 2, wherein said further deciding means includes a means for deciding the amount of light emission on the basis of a measured light value obtained by a light measuring action performed by using light which corresponds to light incident on an exposure portion during process of exposure.

4. A control device according to claim 3, wherein said further deciding means includes a means for deciding the amount of light emission on the basis of a measured light value obtained by a light measuring action performed by using light reflected from an exposure surface during exposure.

5. A control device according to claim 1, further comprising informing means for performing a predetermined informing action if the light-emission control of the flash device based on the decision of said deciding means is restrained by said restraining means.

6. A control device according to claim 1, wherein said aperture value determining means includes a means for determining a full-open aperture value of an interchangeable lens mounted on the camera.

7. A control device according to claim 6, wherein said aperture value determining means includes a means for determining the full-open aperture value of the interchangeable lens on the basis of a signal which corresponds to the full-open aperture value of the interchangeable lens and is transmitted from the interchangeable lens mounted on the camera.

8. A control device according to claim 7, wherein said restraining means includes a means for finding whether said aperture value determining means is in a state capable of inputting the signal which corresponds to the full-open aperture value and, if said aperture value determining means is found to be in a state incapable of inputting the signal which corresponds to the full-open aperture value, restraining the light-emission control of the flash device based on the decision of said deciding means from being performed.

9. A control device according to claim 8, wherein said restraining means includes a means for finding whether an interchangeable lens having a transmission part for transmitting the signal which corresponds to the full-open aperture value to the camera is mounted on the camera and, if the interchangeable lens having the transmission part is found to be not mounted on the camera, restraining the light-emission control of the flash device based on the decision of said deciding means from being performed.

10. A control device according to claim 1, wherein said object luminance detecting means includes a means for measuring object luminance obtained without the preliminary light emission in addition to measuring the object luminance obtained during the preliminary light emission, and wherein said deciding means includes a means for deciding the amount of light emission by using both detection results of said object luminance detecting means obtained by measuring the object luminance during the preliminary light emission and by measuring the object luminance without the preliminary light emission.

11. A control device according to claim 10, wherein said object luminance detecting means includes a means for causing measurement of the object luminance without the preliminary light emission to be performed before the preliminary light emission.

12. A control device according to claim 1, wherein said deciding means includes a means for deciding the amount of light emission when a release operation of the camera is performed.

13. A control device according to claim 1, wherein the camera includes mirror means which is switchable between a first state in which incident light reaches an exposure surface and a second state in which incident light reaches a viewfinder, and said deciding means includes a means for using object luminance corresponding to an output of a sensor which incident light reaches when said mirror means is in the second state.

14. A control device according to claim 2, wherein the camera includes mirror means which is switchable between a first state in which incident light reaches an exposure surface and a second state in which incident light reaches a viewfinder, and said further deciding means includes a means for using object luminance corresponding to an output of a sensor which incident light reaches when said mirror means is in the first state.

15. A camera adapted to use a flash device, said camera comprising:

object luminance detecting means for making preliminary light emission before exposure and measuring object luminance obtained during the preliminary light emission;

aperture value determining means for determining a full-open aperture value of a photo-taking lens used for said camera;

deciding means for deciding an amount of light emission to be made by the flash device during exposure by said camera, in accordance with a detection result of said object luminance detecting means and a determination result of said aperture value determining means; and restraining means for finding whether said camera is in such a state as to have the full-open aperture value correctly determined by said aperture value determining means and, if said camera is found to be not in such a state as to have the full-open aperture value correctly determined by said aperture value determining means, restraining light-emission control of the flash device based on a decision of said deciding means from being performed.

* * * * *

UNITED STATES PATENT AND TRADEMARK OFFICE
CERTIFICATE OF CORRECTION

PATENT NO.   : 6,029,011
DATED        : February 22, 2000
INVENTOR(S)  : Yoichi Sato It is certified that error appears in the above-identified patent and that said Letters Patent are hereby corrected as shown below:

Col. 12, line 40, delete "$Q=K \times F(Vc)$" and insert -- $Q=K \times F_1(Vc)$ --.

Signed and Sealed this

Seventeenth Day of April, 2001

Attest:

NICHOLAS P. GODICI

*Attesting Officer*    *Acting Director of the United States Patent and Trademark Office*